(12) United States Patent
Freeman et al.

(10) Patent No.: US 8,931,096 B2
(45) Date of Patent: Jan. 6, 2015

(54) DETECTING MALICIOUS USE OF COMPUTER RESOURCES BY TASKS RUNNING ON A COMPUTER SYSTEM

(75) Inventors: Robert G. Freeman, Chamblee, GA (US); Gunter Ollmann, Norcross, GA (US)

(73) Assignee: International Business Machines Corporation, Armonk, NY (US)

(*) Notice: Subject to any disclaimer, the term of this patent is extended or adjusted under 35 U.S.C. 154(b) by 35 days.

(21) Appl. No.: 13/315,895

(22) Filed: Dec. 9, 2011

(65) Prior Publication Data

US 2012/0084862 A1 Apr. 5, 2012

Related U.S. Application Data

(63) Continuation-in-part of application No. 12/261,026, filed on Oct. 29, 2008, now abandoned.

(51) Int. Cl.
| | |
|---|---|
| *G06F 11/00* | (2006.01) |
| *G06F 12/14* | (2006.01) |
| *G06F 12/16* | (2006.01) |
| *H04L 29/06* | (2006.01) |
| *G06F 21/56* | (2013.01) |
| *G06F 11/34* | (2006.01) |

(52) U.S. Cl.
CPC .............. *H04L 63/14* (2013.01); *H04L 63/145* (2013.01); *G06F 21/56* (2013.01); *G06F 11/3495* (2013.01); *G06F 21/566* (2013.01); *G06F 2221/2101* (2013.01)
USPC ............ 726/23; 726/22; 726/24; 726/25; 713/188; 709/220; 709/223; 709/227; 709/238

(58) Field of Classification Search
CPC ................. H04L 63/145; G06F 21/56
USPC ........................................... 726/23
See application file for complete search history.

(56) References Cited

U.S. PATENT DOCUMENTS 6,216,173 B1 * 4/2001 Jones et al. .................. 715/705
7,328,453 B2 2/2008 Merkle, Jr. et al.
(Continued)

FOREIGN PATENT DOCUMENTS

| JP | 2005004064 A | 1/2005 |
|---|---|---|
| JP | 2005025269 A | 1/2005 |

OTHER PUBLICATIONS

Cai et al., "Detecting a Malicious Executable without Prior Knowledge of Its Patterns," Proceedings of SPIE, v 5812, Data Mining, Intrusion Detection, Information Assurance, and Data Networks Security 2005, 2005, p. 1-12, Los Alamos, NM.

(Continued)

*Primary Examiner* — Arvin Eskandarnia
(74) *Attorney, Agent, or Firm* — Yee & Associates, P.C.; Lisa J. Ulrich

(57) ABSTRACT

A method, apparatus, and computer program product for identifying malware is disclosed. The method identifies processes in a running process list on a host computer system. The method identifies ports assigned to the processes in the running process list on the host computer system. The method determines whether any one of ports that is currently in use in the host computer system is not assigned to any of the processes in the running process list. The method then makes a record that a hidden, running process is present as a characteristic of an attack in response to a determination that one of the ports is currently in use but is not assigned to any of the processes in the running process list in the host computer system.

20 Claims, 11 Drawing Sheets

(56) References Cited

U.S. PATENT DOCUMENTS

| | | |
|---|---|---|
| 7,418,732 B2 | 8/2008 | Campbell et al. |
| 7,475,135 B2 | 1/2009 | Bantz et al. |
| 7,509,675 B2 | 3/2009 | Aaron |
| 7,523,502 B1* | 4/2009 | Kennedy et al. ............... 726/24 |
| 7,594,270 B2 | 9/2009 | Church et al. |
| 7,665,136 B1* | 2/2010 | Szor ............................. 726/22 |
| 7,685,254 B2* | 3/2010 | Pandya ........................ 709/217 |
| 7,793,347 B2 | 9/2010 | Rozas |
| 7,841,006 B2 | 11/2010 | Gassoway |
| 7,874,001 B2 | 1/2011 | Beck et al. |
| 7,934,259 B1* | 4/2011 | Kennedy ....................... 726/24 |
| 7,945,955 B2 | 5/2011 | Katkar |
| 7,979,889 B2 | 7/2011 | Gladstone et al. |
| 8,051,180 B2 | 11/2011 | Mazzaferri et al. |
| 8,117,667 B2 | 2/2012 | Merkle et al. |
| 8,302,196 B2 | 10/2012 | Soderberg et al. |
| 8,413,245 B2 | 4/2013 | Kraemer et al. |
| 2004/0003284 A1* | 1/2004 | Campbell et al. ............. 713/201 |
| 2004/0030912 A1* | 2/2004 | Merkle et al. ................. 713/200 |
| 2005/0086526 A1* | 4/2005 | Aguirre ........................ 713/201 |
| 2006/0156380 A1 | 7/2006 | Gladstone et al. |
| 2006/0179483 A1 | 8/2006 | Rozas |
| 2006/0203736 A1* | 9/2006 | Molen et al. ................. 370/245 |
| 2006/0224930 A1 | 10/2006 | Bantz et al. |
| 2007/0022287 A1 | 1/2007 | Beck et al. |
| 2007/0079178 A1* | 4/2007 | Gassoway ..................... 714/38 |
| 2007/0143848 A1 | 6/2007 | Kraemer et al. |
| 2007/0169194 A1* | 7/2007 | Church et al. ................. 726/23 |
| 2007/0198656 A1* | 8/2007 | Mazzaferri et al. ........... 709/218 |
| 2007/0240212 A1* | 10/2007 | Matalytski ..................... 726/22 |
| 2007/0300061 A1 | 12/2007 | Kim et al. |
| 2008/0066145 A1* | 3/2008 | Molen et al. ..................... 726/1 |
| 2008/0148407 A1 | 6/2008 | Katkar |
| 2008/0178299 A1* | 7/2008 | Merkle et al. .................. 726/29 |
| 2008/0235801 A1 | 9/2008 | Soderberg et al. |
| 2008/0320594 A1* | 12/2008 | Jiang .............................. 726/24 |
| 2009/0007269 A1* | 1/2009 | Bianco ........................... 726/25 |
| 2009/0044277 A1* | 2/2009 | Aaron ............................ 726/25 |
| 2010/0107257 A1* | 4/2010 | Ollmann ........................ 726/24 |

OTHER PUBLICATIONS

Park et al., "A Similarity based Technique for Detecting Malicious Executable Files for Computer Forensics," Proceedings of IEEE International Conference on Information Reuse and Integration, 2007, 6 pages.

Office Action, dated May 2, 2011, regarding U.S. Appl. No. 12/261,026, 25 pages.

Final Office Action, dated Oct. 19, 2011, regarding U.S. Appl. No. 12/261,026, 21 pages.

* cited by examiner

DETECTING MALICIOUS USE OF COMPUTER RESOURCES BY TASKS RUNNING ON A COMPUTER SYSTEM

This application is a continuation-in-part of application Ser. No. 12/261,026, filed Oct. 29, 2008, status pending, which is incorporated herein by reference.

BACKGROUND

1. Field

The present disclosure relates to computer systems and software, and more specifically, to managing computer resources. Still more specifically, the present disclosure relates to a method and system for detecting malicious use of computer resources by a task running on a computer system.

2. Description of the Related Art

Unwanted tasks frequently use complex techniques to hide from users of the host computer system. Various technologies have been proposed to detect "rootkits" and other stealth install techniques. These existing techniques require the querying of the host computer system through local means in a powered and unpowered state. These existing techniques, in particular, the process of assessing a host computer system in an unpowered state, is highly disruptive and time-consuming. As such, a need is present for administrators to effectively identify the presence of such installations without powering down the host computer system.

Unwanted software and malware run as tasks on the host computer systems. These unwanted tasks use computer resources that are otherwise needed for use by legitimate tasks. Because of this competition for computer resources, if the unwanted tasks are not identified and removed from host computer systems, the legitimate tasks will not perform as desired on the host computer systems.

Therefore, it would be advantageous to have a method, system, and computer program product that takes into account at least some of the issues discussed above, as well as possibly other issues.

SUMMARY

According to one illustrative embodiment, a method, apparatus, and computer program product for identifying malware is provided. A computer system identifies processes in a running process list on a host computer system. The computer system identifies ports assigned to the processes in the running process list on the host computer system. The computer system identifies ports currently in use in the host computer system. The computer system determines whether any one of the ports that is currently in use in the host computer system is not assigned to any of the processes in the running process list in the host computer system. The computer system then makes a record that a hidden, running process is present as a characteristic of an attack in response to a determination that one of the ports is currently in use but not assigned to any of the processes in the running process list in the host computer system.

DETAILED DESCRIPTION

Figure 1:
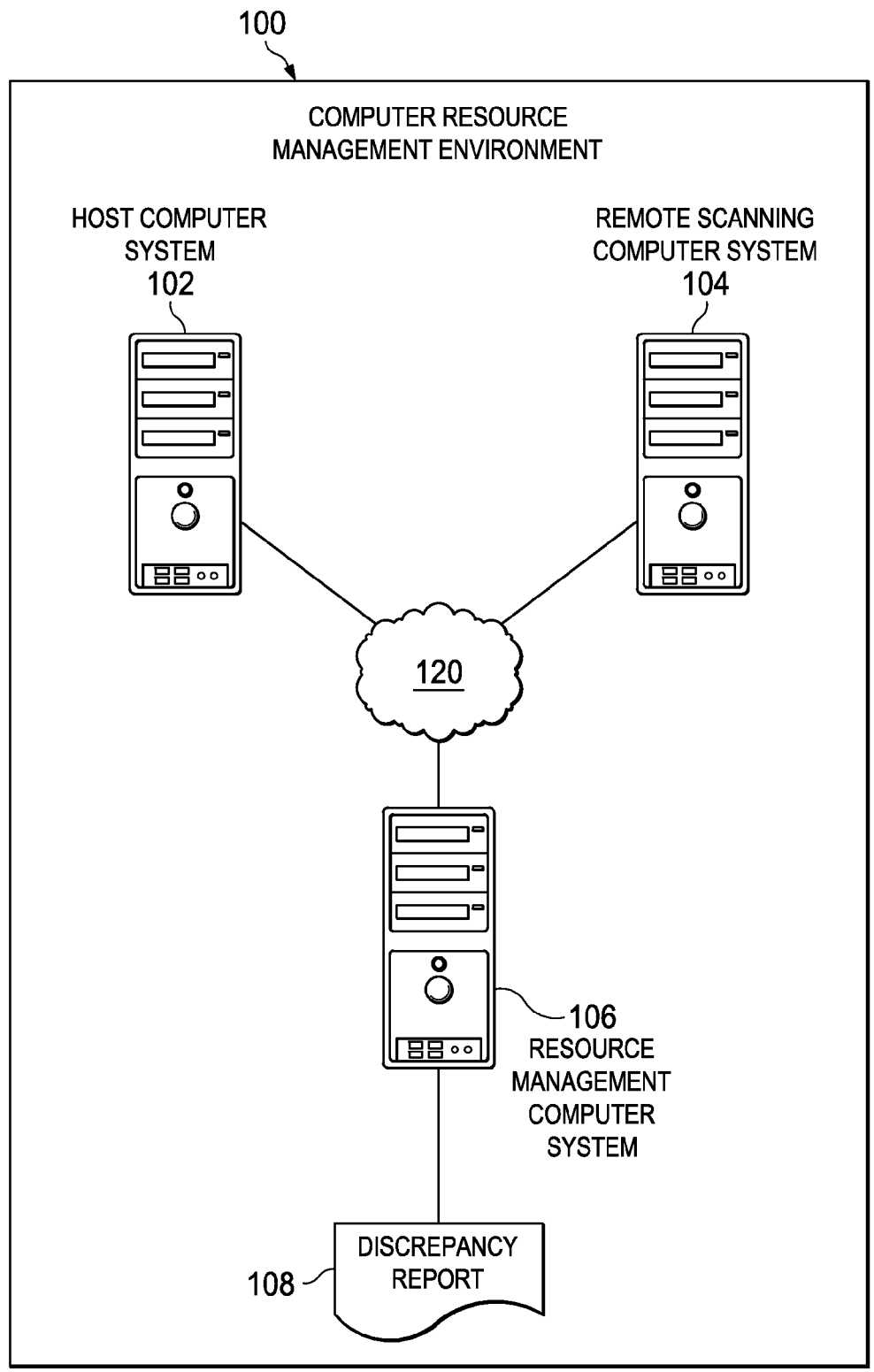
FIG. 1 is a schematic block diagram illustrating one embodiment of a system for detecting presence of malicious use of computer resources by a task on a host computer system in accordance with an illustrative embodiment.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any computer-readable storage device having computer-usable program code stored therein. The computer-readable storage device may be, for example, without limitation, an electronic, magnetic, optical, electromagnetic, infrared, or semiconductor system, apparatus, device, More specific examples (a non-exhaustive list) of the computer-readable storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The computer-usable program code may be downloaded to a computer via a network comprising wireless, wire line, optical fiber cable, RF, routers, firewalls, gateway computers, etc.

Computer program code for carrying out operations of the present invention may be written in any combination of one or more programming languages, including an object-oriented programming language, such as Java, Smalltalk, C++, or the like, and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions.

These computer program instructions may be installed in a general purpose computer or other computing device with a processor and executed by the processor via a RAM to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable storage device that can direct a computer or other programmable data processing apparatus to function in a particular manner, such that the instructions stored in the computer-readable storage device produce an article of manufacture including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which run on the computer or other programmable apparatus provide processes for implementing the functions/acts specified in the flowchart and/or block diagram block or blocks.

In one illustrative embodiment, a method and apparatus detects a presence of malicious tasks on a computer system or host system. A "task" as used herein, with reference to a use of computer resources, means one or more instances of software running on a computer system. For example, instances of software running on a computer system may be processes. In this example, each process may also have one or more child process of the parent process that is the instance of software running on the computer system. For example, a task may be an instance of a computer program, an instance of a service program, code being executed for a device, such as device driver code, an operating system service, a script being executed in the computer system, interpreted code being executed in the computer system, virtualized software being executed in the computer system, and any other instance of software running on a computer system. Particularly, each task running on host computer systems may use computer resources. Still more particularly, a "task" as used herein, may be identified as malicious software and/or malware running on a host computer system.

A "computer resource" as used herein, with reference to use by a task, means one or more components in a computing environment for use by one or more tasks. Computer resources can be software, hardware, or a combination of the two. For example, computer resources may be tasks on computer systems. A use of a computer resource by a task may be affected by other tasks. For example, two or more tasks may be using the same computer resource at the same time. Specifically, a "set of computer resources in use by a task" as used herein, may be a network service or network services. A "set" as used herein with reference to computer resources, means one or more computer resources. For example a "set of computer resources" is one or more computer resources. Still more particularly, a "set of computer resources in use by a task" as used herein, may be a network service comprising one or more ports currently in use by the task communicating over a network.

With reference to the figures and, in particular, with reference to FIG. 1, computer resource management environment 100 is an illustration of an environment in which a method and apparatus may be implemented for detecting presence of malicious use of computer resources by tasks on a host computer system in accordance with an illustrative embodiment. As shown in FIG. 1, computer resource management environment 100 includes host computer system 102 that is remotely connected to network 120.

In an illustrative example, host computer system 102 has a local scanning tool installed thereon for conducting a local scan to interrogate host computer system 102. The local scanning tool runs on host computer system 102 and determines local tasks currently on host computer system 102. These tasks may be currently running on host computer system 102.

Further, computer resource management environment 100 includes remote scanning computer system 104 that is also connected to network 120 and is remote to host computer system 102. In an illustrative embodiment, remote scanning computer system 104 includes a remote scanning tool for conducting a remote scan of host computer system 102 for enumerating a remote inventory of tasks currently running on host computer system 102.

Additionally, computer resource management environment 100 includes resource management computer system 106 connected to network 120, resource management computer system 106 having a resource management tool deployed thereon for correlating results received from the local scanning tool on host computer system 102 and the remote scanning tool on remote scanning computer system 104. In an illustrative embodiment, resource management computer system 106 collects results of the local scan conducted by the local scanning tool on host computer system 102. Further, the resource management tool on resource management computer system 106 also collects results of the remote scan conducted by the remote scanning tool on remote scanning computer system 104 on host computer system 102.

Furthermore, the resource management tool deployed on resource management computer system 106 compares the local inventory of task results enumerated by the local scanning tool on host computer system 102 with the remote inventory of task results enumerated by the remote scanning tool on remote scanning computer system 104. The comparison performed by the resource management tool identifies any discrepancies between the local inventory results obtained from host computer system 102 and the remote inventory results obtained from remote scanning computer system 104. Any discrepancies found may indicate the presence of malicious tasks on host computer system 102.

Further, in an illustrative example, resource management computer system 106 includes a reporting tool for generating discrepancy report 108 that identifies any discrepancies between the local scan performed by the local scanning tool on host computer system 102 and the remote scan performed by the remote scanning tool on remote scanning computer system 104 on host computer system 102 for identifying a presence of malicious use of computer resources by tasks on host computer system 102.

Figure 2:
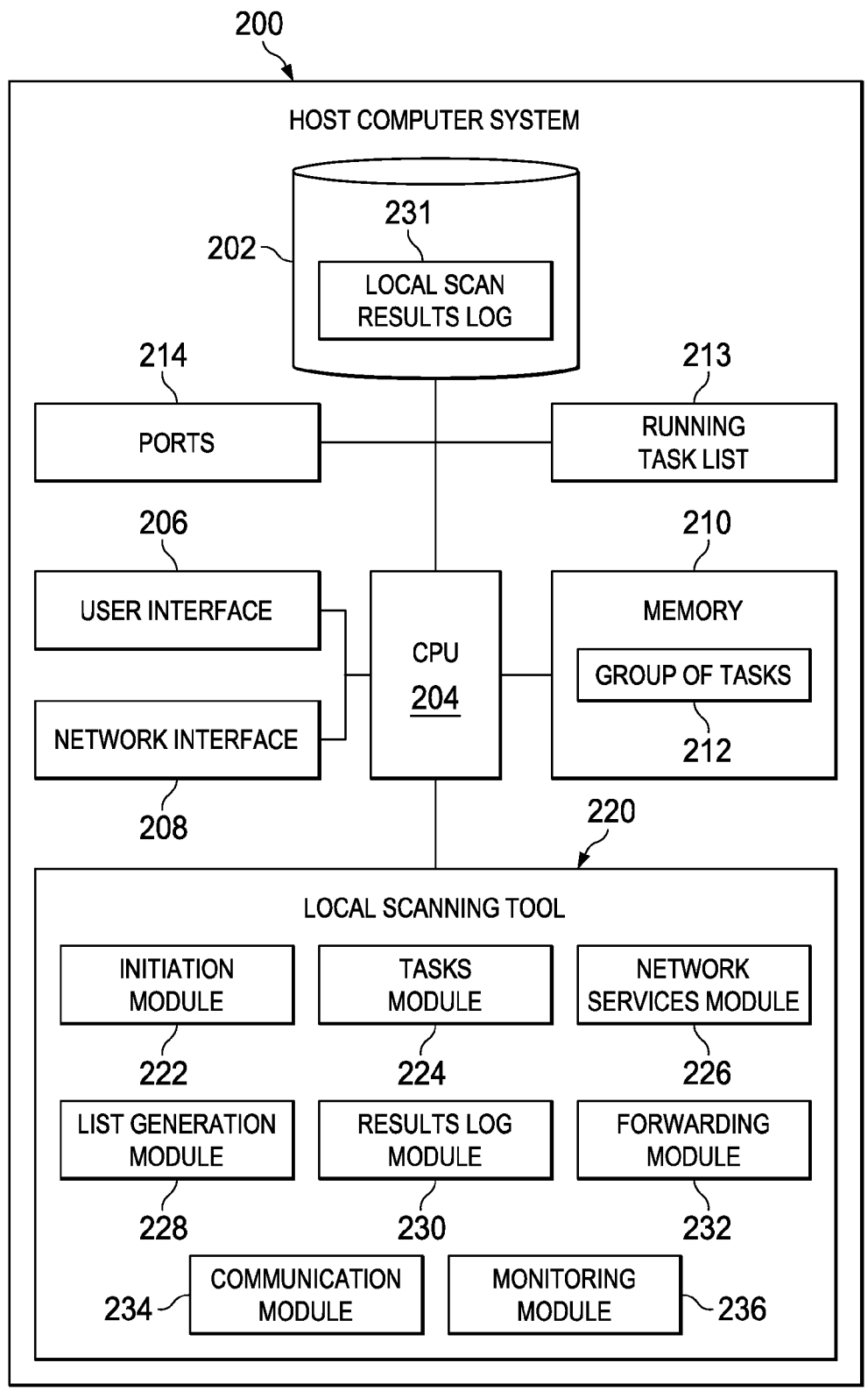
FIG. 2 is a host computer system having deployed thereon a local scanning tool for performing a local scan of the host computer system for detecting malicious use of computer resources by a task on a host computer system in accordance with an illustrative embodiment.

Turning next to FIG. 2, an illustration of a host computer system is depicted in accordance with an illustrative embodiment. Host computer system 200 is an example of an implementation for host computer system 102 shown in FIG. 1. Host computer system 200 may have deployed thereon a computer program product, namely, a local scanning tool for conducting a local scan of host computer system 200 for detecting malicious use of computer resources by a task on host computer system 200.

As depicted, host computer system 200 is a computer system or server that includes central processing unit (CPU) 204, local storage device 202, user interface 206, network interface 208, and memory 210. Central processing unit 204 may be configured generally to execute operations within host computer system 200. User interface 206, in one embodiment, may be configured to allow a user to interact with host computer system 200, including allowing input of commands and data for conducting a local scan of host computer system 200. Network interface 208 may be configured, in one embodiment, to facilitate network communications of host computer system 200 over a communications channel of network 120 in FIG. 1.

In an illustrative example, memory 210 may be configured to store a group of tasks 212. A "group" as used herein with reference to tasks, means one or more tasks. For example, a "group of tasks" is one or more tasks. Group of tasks 212 may include tasks retrieved from running task list 213 of host computer system 200. For example, running task list 213 of host computer system 200 may comprise the list of tasks that are known to be running in host computer system 200. For example, the Microsoft Windows™ operating system will provide a list of running tasks (also known as processes) by query to a "Task manager" function in the operating system. Some malicious processes are able to hide from the task manager by installing themselves as a service as opposed to as an application in the task manager, by modifying the task manager to not show themselves, and by only temporarily running in the task manager. For example, a malicious task may hide from the task manager by quitting, which has the effect of removing itself from the task manager. Group of tasks 212 may also include hidden tasks in host computer system 200. For example, a hidden task in host computer system 200 may be malware that is not in running task list 213 in host computer system 200. Still more particularly, "group of tasks 212" may be one or more tasks communicating over a network using one or more ports, such as a ports 214. In these illustrative examples, group of tasks 212 may use ports 214 to communicate over of a set of network services. In these illustrative examples, one or more ports in ports 214 may be a group of open ports. "Open port" as used herein, means a port can be used by group of tasks 212. For example, "group of tasks 212" may be one or more tasks communicating over a network using the group of open ports in ports 214. In these illustrative examples, ports 214 may be assigned to tasks on running task list 213 on host computer system 200. For example, a task on running task list 213 may be assigned to use a particular port in ports 214 for communicating over a set of network services of host computer system 200. List generation module 228 determines which ports are currently in use/open by enumerating the tasks having assignments to ports in running task list 213 on host computer system 200. Monitoring module 236 determines which ports are currently used by the tasks in the task list by monitoring group of tasks 212 running on host computer system 200.

In these illustrative examples, if a port in ports 214 is reported by one computer system as open, and the same port in ports 214 is reported by another computer as closed, the difference will be identified by a resource management tool in resource management computer system 106. Further, the difference will be used by the resource management tool as an indication of an attack by a task in group of tasks 212 using the port in ports 214 to communicate over the set of network services. As used herein, an "attack" by a task or group of tasks, means a malicious use of computer resources.

In these illustrative examples, resource management computer system 106 may identify a characteristic of an attack by a hidden task in group of tasks 212 based on a determination by resource management computer system 106 that an open port in ports 214 on host computer system 200 is in use by a hidden task in group of tasks 212. More particularly, resource management computer system 106 may also identify an attack by a task in group of tasks 212 based on a determination by resource management computer system 106 that an open port in ports 214 on host computer system 200 is in use by a task in group of tasks 212 that is not assigned to the port in running task list 213 on host computer system 200. This is one factor indicating an attack but is not typically determinative, on its own, of an actual attack. The determination may be made by comparing the ports assigned to tasks on running task list 213 in on host computer system 200 with ports that are in use in on host computer system 200.

In this illustrative example, local scanning tool 220, which runs on host computer system 200, comprises a logic unit that contains a plurality of modules configured to functionally execute the necessary steps of performing a local scan of host computer system 200 for generating a local inventory of tasks on host computer system 200. In this illustrative example, local scanning tool 220, running on host computer system 200, includes initiation module 222, tasks module 224, network services module 226, list generation module 228, results log module 230, forwarding module 232, communication module 234, and monitoring module 236. In an embodiment, initiation module 222 may be configured to initiate a local scan of host computer system 200. Tasks module 224 may be configured to generate a list of the tasks on host computer system 200. Further, network services module 226 may be configured to generate a list of network services in use by tasks on host computer system 200. In one illustrative embodiment, a set of network services in use by tasks may include a list of ports in use by tasks communicating over network 120.

In an illustrative example, list generation module 228 may be configured to generate a list enumerating the tasks in running task list 213 on host computer system 200, the network services in use by the tasks, and the networks services assigned to the tasks. Results log module 230 may be configured to generate a log of the results of the local scan conducted on host computer system 200. In an embodiment, local scan results log 231 generated by results log module 230 are stored in local storage device 202 within host computer system 200. Forwarding module 232 may be configured to forward the results of the local scan performed on host computer system 200. For example, forwarding module 232 may forward the results of the local scan for further evaluation. Particularly, the results may be forwarded by forwarding module 232 to the resource management tool on resource management computer system 106 in FIG. 1.

Communication module 234 may be configured to permit communication between the various modules of local scanning tool 220, memory 210, and local storage device 202; and between the components of host computer system 200 and external computer systems connected to the host computer system 200 over network 120.

In these illustrative examples, monitoring module 236 is a monitoring program and may be configured to monitor group of tasks 212 running on host computer system 200. Further, monitoring module 236 monitors performance for group of tasks 212. Still further, monitoring module 236 may monitor group of tasks 212 to identify performance information for use of a set of computer resources by group of tasks 212. For example, performance information for the use of a set of computer resources by group of tasks 212 may include a value indicating how many times a port of a network service was used by group of tasks 212, an amount of data sent over a port of a network service by group of tasks 212, and any other performance information suitable for identifying a use of a set of computer resources by group of tasks 212. In this illustrative example, the set of computer resources is a set of network services. Performance information identified by monitoring module 236 is added to the results of each local scan and likewise forwarded by forwarding module 232. In this manner, monitoring module 236 may aide in determining whether group of tasks 212 using a set of resources is an attack. Although the illustrative examples are directed toward processes in the form of tasks, other examples may be applied other than tasks. With other processes, a running process list may be generated in a similar fashion to running task list 213. For example, running task list 213 may be a running list of processes.

Figure 3:
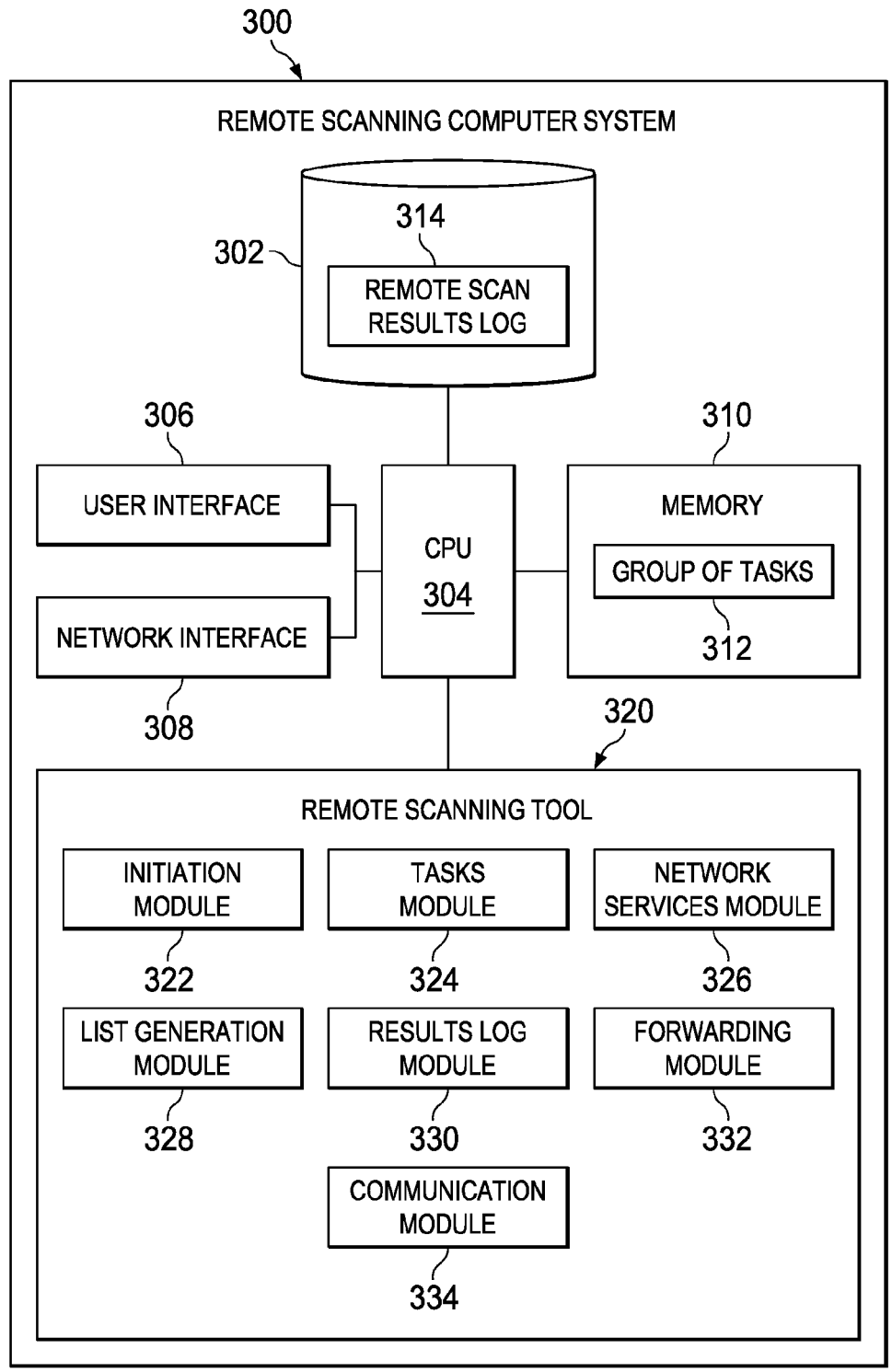
FIG. 3 is a computer system having deployed thereon a remote scanning tool for performing a remote scan of a remote computer system for detecting malicious use of computer resources by a task on a host computer system in accordance with an illustrative embodiment.

With reference now to FIG. 3, an illustration of a remote scanning computer system is depicted in accordance with an illustrative embodiment. Remote scanning computer system 300 is an example of an implementation for remote scanning computer system 104 shown in FIG. 1. Remote scanning computer system 300 may have deployed thereon a computer program product, namely, remote scanning tool 320 for opening connections with host computer system 200 in FIG. 2 and for conducting a remote scan of host computer system 200 for detecting malicious use of computer resources by a task on host computer system 200 in accordance with an illustrative embodiment. Remote scanning tool 320 is run within remote scanning computer system 300.

As depicted, remote scanning computer system 300 is a computer system or server that includes central processing unit (CPU) 304, local storage device 302, user interface 306, network interface 308, and memory 310. Central processing unit 304 may be configured generally to perform operations within remote scanning computer system 300. User interface 306, in one embodiment, may be configured to allow a user to interact with remote scanning computer system 300, including allowing input of commands and data for conducting a remote scan of host computer system 200 from remote scanning computer system 300. Network interface 308 may be configured, in one embodiment, to facilitate network communications of remote scanning computer system 300 over a communications channel of network 120 in FIG. 1.

In an illustrative example, memory 310 may be configured to store group of tasks 312. In one embodiment, as shown in FIG. 3, remote scanning tool 320 runs on remote scanning computer system 300 and comprises a logic unit that contains a plurality of modules configured to functionally perform the steps for a remote scan of host computer system 200 for enumerating a remote inventory of tasks on host computer system 200. In an embodiment, shown in FIG. 3, remote scanning tool 320 running on remote scanning computer system 300 includes initiation module 322, tasks module 324, network services module 326, list generation module 328, results log module 330, forwarding module 332, and communication module 334.

In an illustrative example, initiation module 322 may be configured to initiate a remote scan of all ports of host computer system 200 over network 120 using network interface 308. Tasks module 324 may be configured to enumerate or list all tasks on host computer system 200. Further, network services module 326 may be configured to enumerate or list all network services in use by tasks on host computer system 200. In an embodiment, list generation module 328 may be configured to generate a list enumerating the tasks on host computer system 200 and the network services in use by the tasks.

Results log module 330 may be configured to generate remote scan results log 314 as a log of the results of the remote scan conducted on host computer system 200. In an embodiment, remote scan results log 314 generated by results log module 330 is stored in local storage device 302 within remote scanning computer system 300. Forwarding module 332 may be configured to forward the results of the remote scan performed on host computer system 200 to another computer system comprising a resource management tool for evaluating the remote scan results received from remote scanning computer system 300. Communication module 334 may be configured to permit communication between the various modules of remote scanning tool 320, memory 310, and local storage device 302; and between the components of remote scanning computer system 200 and external computer systems connected to remote scanning computer system 300 over network 120.

Figure 4:
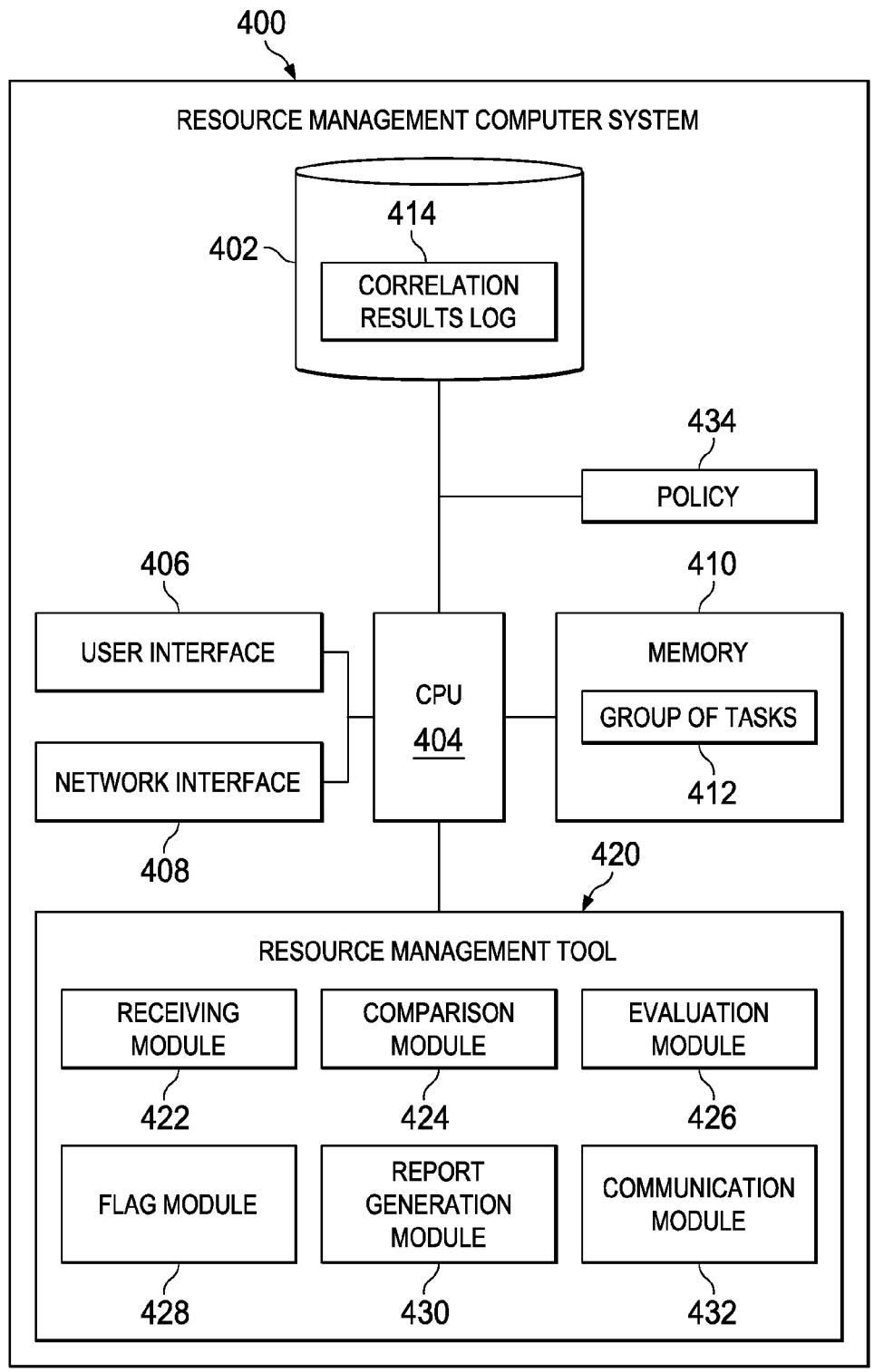
FIG. 4 depicts a computer system having deployed thereon a resource management tool for analyzing a use of computer resources by a task on a host computer system to detect if the use is malicious, in accordance with an illustrative embodiment.

Turning to FIG. 4, an illustration of a resource management computer system is depicted in accordance with an illustrative embodiment. Resource management computer system 400 is an example of an implementation for resource management computer system 106 shown in FIG. 1. Resource management computer system 400 may have deployed thereon a computer program product, namely, resource management tool 420 for analyzing a use of computer resources by a task on host computer system 200 in FIG. 2 to detect if the use is malicious in accordance with an illustrative embodiment.

As depicted, resource management computer system 400 is a computer system or server that includes a central processing unit (CPU) 404, local storage device 402, user interface 406, network interface 408, and memory 410. Central processing unit 404 may be configured generally to perform operations within resource management computer system 400. User interface 406, in one embodiment, may be configured to allow a user to interact with resource management computer system 400, including allowing input of commands and data for collecting and analyzing scan results from two or more computer systems or servers, such as host computer system 200 in FIG. 2 and remote scanning computer system 300 in FIG. 3.

Network interface 408 may be configured, in one embodiment, to facilitate network communications of resource management computer system 400 over communications channels of network 120 in FIG. 1. In an illustrative embodiment, memory 410 may be configured to store group of tasks 412. In one embodiment, as shown in FIG. 4, resource management tool 420 runs on resource management computer system 400 and comprises a logic unit that contains a plurality of modules configured to functionally perform the necessary steps for an evaluation of the scanning results received from both host computer system 200 and remote scanning computer system 300 for detecting presence of any malicious tasks on host computer system 200. In this illustrative example, resource management tool 420 running on resource management computer system 400 includes receiving module 422, comparison module 424, evaluation module 426, flag module 428, report generation module 430, and communication module 432.

In an illustrative example, receiving module 422 may be configured to receive both local scan results from host computer system 200 that is suspected of having malicious tasks thereon and remote scan results from remote computer system 300 that conducts a remote scan of host computer system 200 over network 120. Comparison module 424 may be configured to compare a list of tasks on host computer system 200 generated as a result of a local scan performed with a list of tasks on host computer system 200 generated as a result of a remote scan performed on host computer system 200. In an embodiment, comparison module 424 also compares a list of network services in use by tasks on host computer system 200 from a local scan on host computer system 200 with a set of network services in use by tasks on host computer system 200 from a remote scan of host computer system 200 by remote scanning computer system 300.

Further, evaluation module 426 may be configured to evaluate the comparisons conducted by comparison module 424 in order to generate correlation results stored in correlation results log 414 in storage device 402. These comparisons may be made to determine whether any discrepancies are found between the local scanning results and the remote scanning results. Flag module 428 may be configured to flag host computer system 200 as suspected of having malicious tasks thereon as a result of the evaluation conducted by evaluation module 426. Report generation module 430 may be configured to generate a discrepancy report enumerating the discrepancies found between the local scan and the remote scan as evaluated by evaluation module 426. In an embodiment, communication module 432 may be configured to permit communication between the various modules of resource management tool 420, memory 410, local storage device 402; and between the components of resource management computer system 400 and external computer systems, such as, for example, host computer system 200 in FIG. 2 and remote scanning computer system 300 in FIG. 3, which are connected to resource management computer system 400 over network 120.

In these illustrative example, policy 434 may be defined in resource management computer system 400. Policy 434 is a set of rules. Policy 434 may be used by resource management tool 420 to process uses of computer resources by tasks collected by local and remote computer systems. Policy 434 may be used by resource management tool 420 for identifying malicious tasks in host computer system 200 to improve performance of the computer resources by tasks. For example, policy 434 may be for requesting user identification regarding a task's use of computer resources, wherein the policy has a rule for determining if a challenge question is used, as well as a rule for determining duration of time for waiting for a user response. For example, the challenge question may be a random question, such as asking the user to identify a word in a picture.

In these illustrative examples, a use of computer resources by a task in host computer system 200 may be flagged as valid or as invalid. For example, a use of computer resources by a task in host computer system 200 may be flagged as valid when the use is validated by a user, when the use is expected, and/or when the use has been previously reported as valid. Likewise, a use of computer resources by a task in host computer system 200 may be flagged as invalid when the use is not validated by a user, when the use is not expected, and/or when the use has been previously reported as invalid.

In these illustrative examples, when a use of computer resources by a task on host computer system 200 is identified as valid or invalid for host computer system 200, a description for the use of computer resources by a task is stored in local storage device 402. For example, the description for the use may include an identification of the task, an identification of host computer system 200, a time when the use occurred, performance information for the use, and whether the use is valid or invalid. In these illustrative examples, an identification of host computer system 200 may include a configuration for host computer system 200. For example, a configuration for host computer system 200 may include a version of an operating system installed on host computer system 200, a group of tasks installed in host computer system 200, and any other configuration information for host computer system 200, as well as for computer resources used by tasks in host computer system 200. For example, storing the description for the use may include making a record of the description for the use in local storage device 402.

Figure 5:
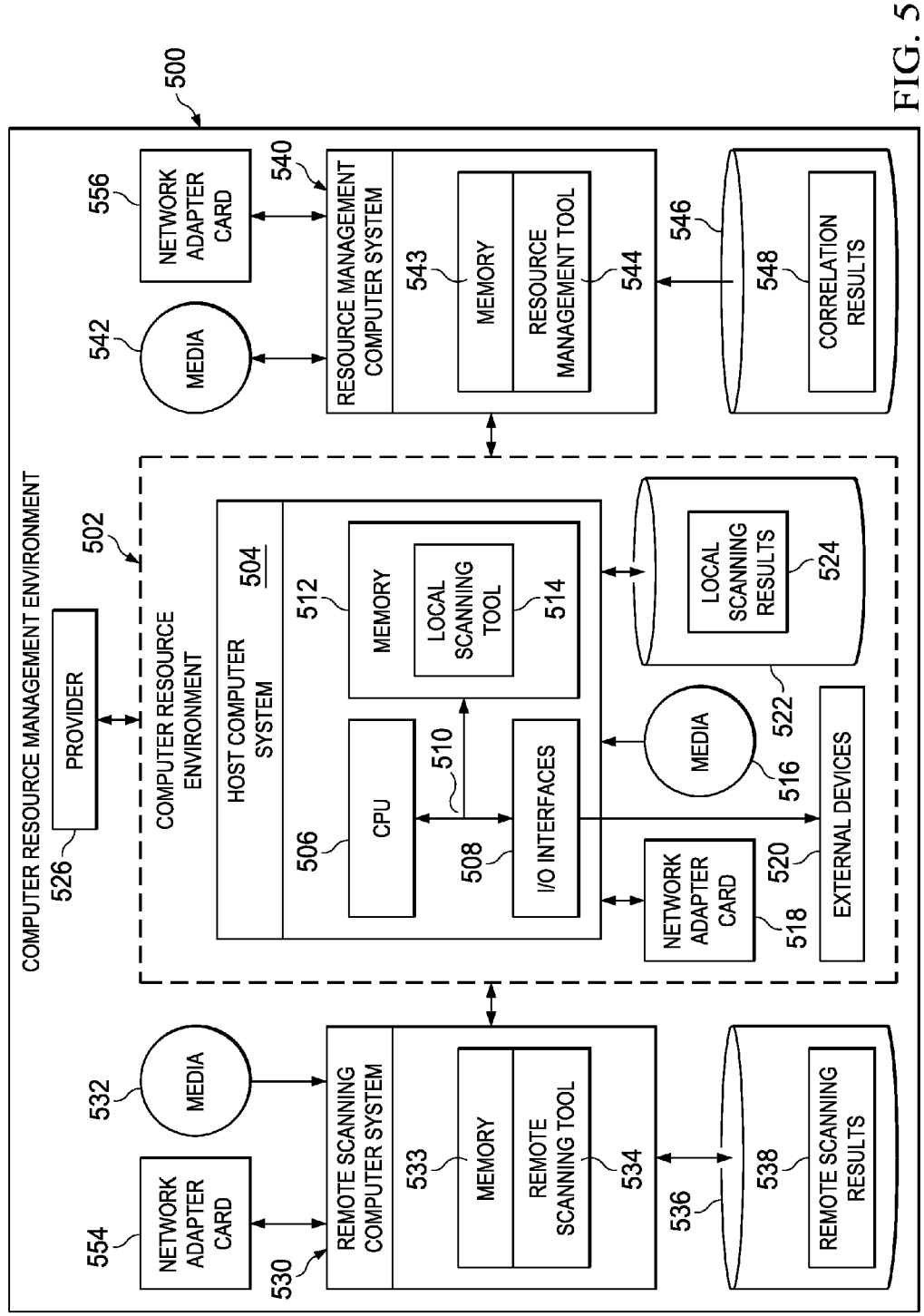
FIG. 5 is a computer resource management environment for detecting malicious use of computer resources by a task on a host computer system in accordance with an illustrative embodiment.

Referring now to FIG. 5, an illustration of a computer resource management environment for detecting malicious use of computer resources by a task on a host computer system is depicted in accordance with an illustrative embodiment. As depicted, computer resource environment 502 within computer resource management environment 500 includes host computer system 504 that has deployed thereon a computer program product, namely, local scanning tool 514, which implements an illustrative embodiment for performing a local scan of host computer system 504. Host computer system 504 is an example of host computer system 102 in FIG. 1. The computer program product comprises a computer-readable or computer-usable storage medium, which provides program code namely, local scanning tool 514, for use by, or in connection with, a computer server or computer system or any instruction execution system.

As depicted, local scanning tool 514 is loaded into memory 512 of host computer system 504 from media 516. Media 516 is a computer-readable storage medium such as, a magnetic tape or disk, optical media, DVD, memory stick, semiconductor memory, etc. Local scanning tool 514 may also be downloaded from a server via network adapter card 518 for installation on host computer system 504. As depicted, computer resource management environment 500 includes computer resource environment 502, which represents any type of computer architecture that is maintained in a secure environment (i.e., for which access control is enforced). Further, computer resource environment 502 includes host computer system 504 that includes local scanning tool 514. It should be understood, however, that although not shown, other hardware and software components (e.g., additional computer systems, routers, firewalls, etc.) could be included in computer resource environment 502.

In general, host computer system 504 is connected via a network to computer resource environment 502. Host computer system 504 includes local scanning tool 514 that is run on host computer system 504 for performing a local scan of the tasks and network services in use by the tasks on host computer system 504. Further, host computer system 504 can communicate with remote scanning computer system 530, which is an example of remote scanning computer system 104 in FIG. 1 and resource management computer system 540, which is an example of resource management computer system 106 in FIG. 1 over network 120 in FIG. 1. For instance, remote scanning computer system 530 can interface with computer resource environment 502 in order to run a remote scan of host computer system 504 using remote scanning tool 534 that is loaded into the memory 533 of remote scanning computer system 530 from media 532. Media 532 is a computer-readable storage medium, such as a magnetic tape or disk, optical media, DVD, memory stick, semiconductor memory, etc. Remote scanning tool 534 may also be downloaded from a server via network adapter card 554 for installation on remote scanning computer system 530. Similarly, resource management computer system 540 communicates with computer resource environment 502 over network 120 to retrieve results of the local scan performed by host computer system 504. Further, resource management computer system 540 communicates with remote scanning computer system 530 to retrieve results of the remote scan of host computer system 504 performed by remote scanning computer system 530.

In an illustrative example, resource management tool 544 is loaded into memory 543 of resource management computer system 540 from media 542. Media 542 is a computer-readable storage medium such as, a magnetic tape or disk, optical media, DVD, memory stick, semiconductor memory, etc. Resource management tool 544 may also be downloaded from a server via network adapter card 556 for installation on resource management computer system 540. As such, resource management computer system 540 receives results of the local scan conducted by host computer system 504 and the results of the remote scan conducted by remote scanning computer system 530 of host computer system 504. Resource management computer system 540 also compares the local scan results with the remote scan results to determine whether host computer system 504 has a malicious task. In the illustrative examples, computer resource environment 502 may be owned and/or operated by a party such as provider 526, or by an independent entity. Regardless, use of computer resource environment 502 and the teachings described herein could be offered to the parties on a subscription or fee-basis.

Host computer system 504 is shown to include central processing unit (CPU) 506, memory 512, bus 510, and input/output (I/O) interfaces 508. Further, host computer system 504 is shown communicating with external devices 520 and storage system 522. In general, central processing unit 506 executes computer program code stored in memory 512, such as local scanning tool 514, to determine the tasks currently on host computer system 504 and the network services currently in use by the tasks. External devices 520 may be resources. In an embodiment, local scanning results 524 produced by the execution of local scanning tool 514 is stored in storage system 522. Although not shown in FIG. 5, remote scanning computer system 530 and resource management computer system 540 each include a central processing unit, a memory, a bus, and input/output (I/O) interfaces, similar to host computer system 504. Further, remote scanning computer system 530 communicates with external devices (not shown) and storage system 536, whereas, resource management computer system 540 communicates with I/O devices and resources (not shown) and storage system 546.

In general, central processing unit 506 executes computer program code stored in memory 512, such as local scanning tool 514, to determine the tasks currently on host computer system 504 and the network services in use by the tasks, whereas, the central processing unit of remote scanning computer system 530 executes computer program code stored in memory 533, such as remote scanning tool 534, to determine the tasks on host computer system 504 and the network services in use by the tasks. Similarly, the central processing unit of resource management computer system 540 executes computer program code stored in memory 543, such as resource management tool 544, to determine any discrepancies between the local scan and the remote scan of host computer system 504.

Further, in an illustrative example, local scanning results 524 produced by the execution of local scanning tool 514 running on host computer system 504 is stored in storage system 522, whereas, remote scanning results 538 produced by the execution of remote scanning tool 534 is stored in storage system 536 of remote scanning computer system 530, and whereas, correlation results 548 performed by the execution of resource management tool 544 on resource management computer system 540 is stored in storage system 546 of resource management computer system 540.

While executing local scanning tool 514 on host computer system 504, central processing unit 506 reads and writes data, such as local scanning results 524 in storage system 522, to and from memory 512. Central processing unit 506 reads and writes data to and from storage system 522 using I/O interfaces 508. Alternatively, local scanning tool 514 may store local scanning results 524 in memory 512. Bus 510 provides a communication link between each of the components in computer resource management environment 500, such that information can be communicated within computer resource environment 502.

External devices 520 can comprise any devices (e.g., keyboard, pointing device, display, etc.) that enable a user to interact with computer resource management environment 500 and any devices (e.g., network card, modem, etc.) that enable host computer system 504 to communicate with one or more other computing devices, such as, remote scanning computer system 530 and resource management computer system 540. Similarly, while executing the remote scanning tool 534 on remote scanning computer system 530, the central processing unit reads and writes data to and from memory 533 and storage system 536, such as remote scanning results 538 in storage system 536.

Alternatively, remote scanning tool 534 may store remote scanning results 538 in memory 533. Further, while executing resource management tool 544 on resource management computer system 540, the central processing unit can read and write data, to and from memory 543 and storage system 546, such as correlation results 548 in storage system 546. Alternatively, resource management tool 544 may store correlation results 548 in memory 543.

Computer resource environment 502 is only an illustrative example of many various types of computer environments for implementing an illustrative embodiment. For example, in one illustrative embodiment, computer resource environment 502 may comprise two or more server groups or clusters that communicate over a network to perform the various process steps of an illustrative embodiment.

Moreover, computer resource management environment 500 is only one representative example of many various possible environments that can include numerous combinations of hardware and software. To this extent, in other embodiments, computer resource management environment 500 can comprise any specific purpose computing-article of manufacture-comprising hardware and computer-program code for performing specific functions, any computing-article of manufacture that comprises a combination of specific purpose and general purpose hardware/software, or the like.

In each case, the program code and hardware can be created using standard programming and engineering techniques, respectively. Moreover, central processing unit 506 may comprise a single central processing unit, or be distributed across one or more processing units in one or more locations, such as, for example, on a client and server. Similarly, memory 512 and storage system 522 can comprise any combination of various types of data storage and/or transmission media that reside at one or more physical locations. Further, I/O interfaces 508 can comprise any system for exchanging information with external devices 520. Still further, it is understood that one or more additional components (e.g., system software, math co-processing unit, etc.) not shown in FIG. 5 can be included in computer resource management environment 500.

Storage systems 522, 536, and 546 can be any type of storage system (e.g., a database) capable of providing storage for information in an illustrative embodiment. To this extent, storage systems 522, 536, and 546 could include one or more storage devices, such as a magnetic disk drive and an optical disk drive. In another embodiment, storage systems 522, 536, and 546 include data distributed across, for example, a local area network (LAN), wide area network (WAN), and a storage area network (SAN) (not shown). Although not shown, additional components, such as cache memory, communication systems, system software, etc., may be incorporated into computer resource management environment 500.

Figure 6:
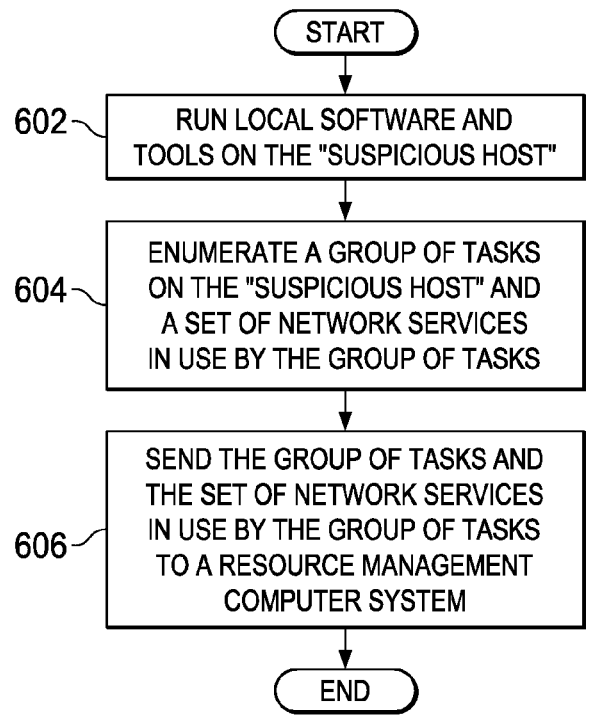
FIG. 6 is a flowchart of a process performed by a host computer system for locally detecting presence of malicious use of computer resources by tasks on the host computer system in accordance with an illustrative embodiment.

Turning to FIG. 6, a flowchart of a process implemented by local scanning tool 220 in host computer system 200 in FIG. 2 for locally detecting presence of malicious use of computer resources by tasks on host computer system 200 which is depicted in accordance with an illustrative embodiment. The process begins by running local scanning tool 220 locally on "suspicious" host computer system 200 suspected of having a malicious task thereon in order to obtain a list of tasks on host computer system 200 and a list of network services in use by the tasks (step 602). Next, local scanning tool 220 enumerates a group of tasks on "suspicious" host computer system 200 and a set of respective network services in use by the group of tasks (step 604). The group of tasks on host computer system 200 and the set of network services in use by the tasks is sent to another computer system on the network, namely, resource management computer system 400 running resource management tool 420 in FIG. 4 for comparison and evaluation of local scanning tool 220 results (step 606) with the process terminating thereafter.

Figure 7:
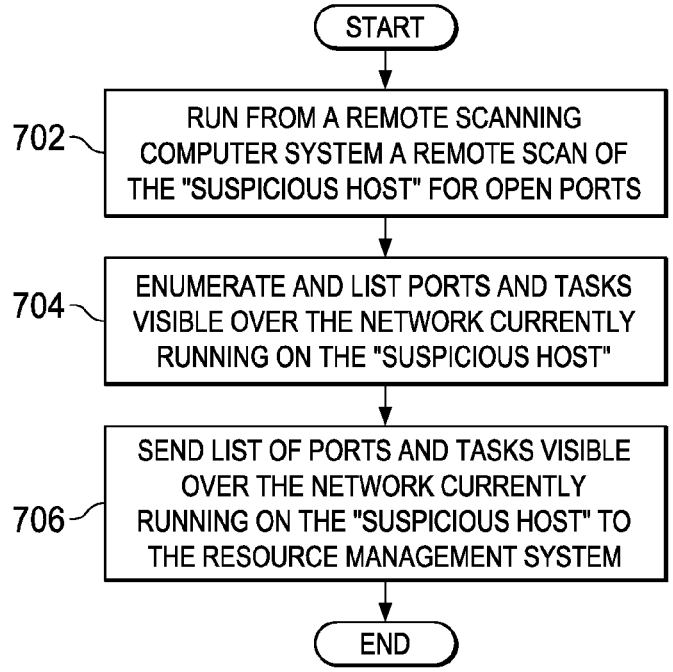
FIG. 7 is a flowchart of a process performed by a remote scanning computer system for remotely detecting presence of malicious use of computer resources by tasks on a host computer system in accordance with an illustrative embodiment.

Reference is now made to FIG. 7, a flowchart of a process for detecting presence of malicious use of computer resources by tasks on host computer system 200 which is depicted in accordance with an illustrative embodiment. The process illustrated may be implemented in remote scanning tool 320 in remote scanning computer system 300 in FIG. 3 that is remote to host computer system 200 in FIG. 2.

The process begins by running remote scanning tool 320 on remote scanning computer system 300 for remotely connecting to host computer system 200 over a network and to obtain a list of ports on the "suspicious" host computer system and a status for each port (step 702). For example, the status for each port may include whether the port is open and/or active in host computer system 200.

Next, the process connects remote scanning tool 320 to host computer system 200 to enumerate and list currently running tasks and their respective ports in use in host computer system 200 (step 704). These ports and tasks are visible over the network. In an embodiment, remote scanning computer system 300 attempts to connect to each open port on host computer system 200 and perform an interrogation of the tasks running on host computer system 200 to determine whether the tasks are known, common tasks, or both. As such, a list of open, closed and filtered ports is obtained by remote scanning computer system 300. Further, the remote scan results listing the enumerated ports and tasks visible over the network are sent to running resource management tool 420 in resource management computer system 400 in FIG. 4 for comparison and evaluation of the scanning results (step 706) with the process terminating thereafter.

Figure 8:
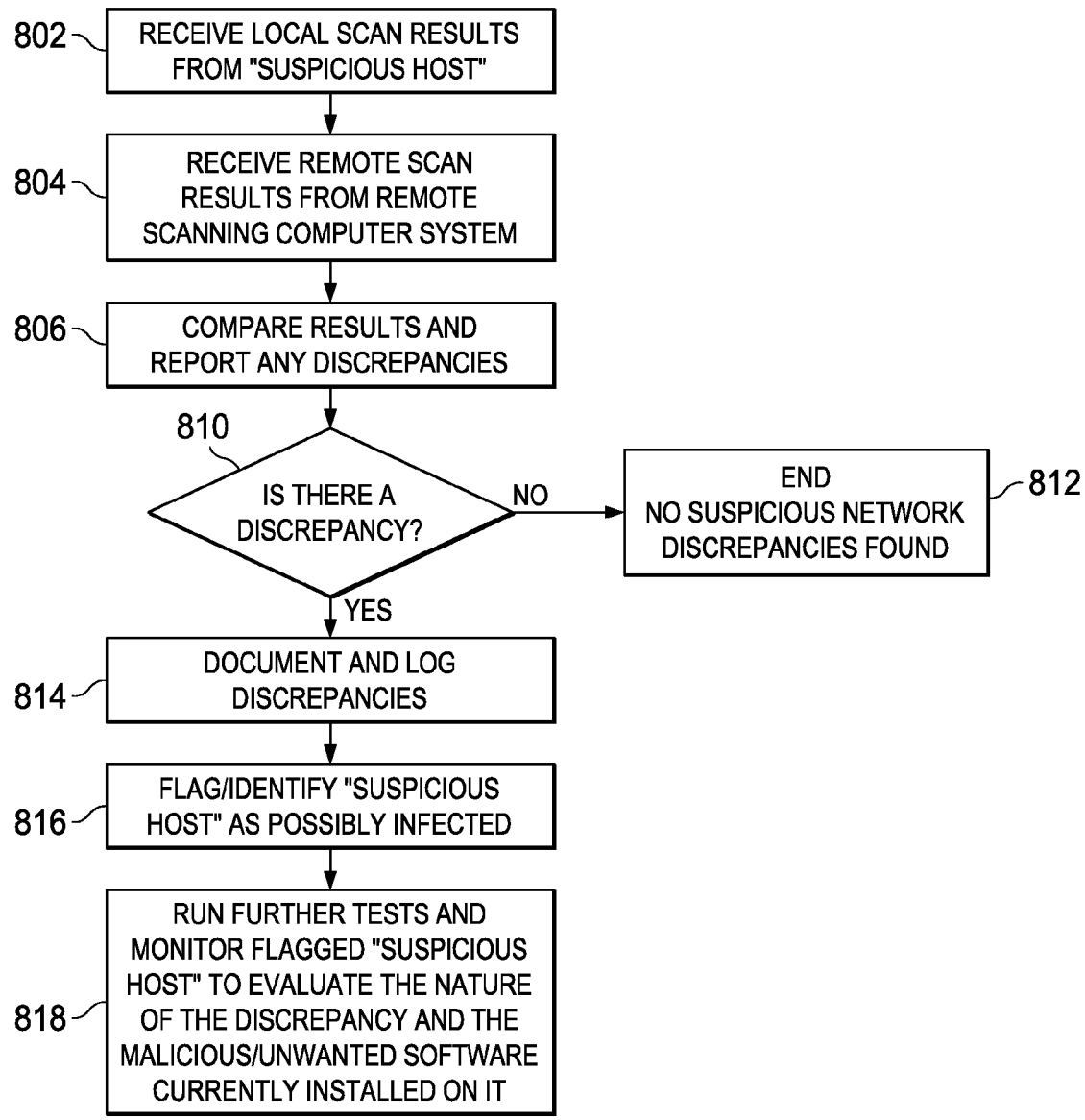
FIG. 8 depicts a flowchart of a process performed by a resource management computer system for detecting presence of malicious use of computer resources by tasks on a host computer system in accordance with an illustrative embodiment.

With reference now to FIG. 8, a flowchart of a process implemented in resource management tool 420 in resource management computer system 400 in FIG. 4 for detecting presence of malicious tasks running on the host computer system is depicted in accordance with an illustrative embodiment.

Resource management tool 420 receives local scanning results from host computer system 200 in FIG. 2 (step 802). Resource management tool 420 receives remote scanning results from remote scanning computer system 300 in FIG. 3 (step 804). Resource management computer system 400 running resource management tool 420 compares the local lists, corresponding to the local scan, and the remote lists, corresponding to the remote scan, of tasks running on host computer system 200 and network services in use by the tasks for any discrepancies (step 806). Any discrepancies found represent hidden tasks and hidden uses of network services and are indicative of unwanted software or malware.

Resource management tool 420 determines whether a discrepancy is present between the local scan and the remote scan (step 810). If resource management tool 420 determines that no discrepancy is present between the local scan and the remote scan, the process indicates that no suspicious network discrepancies are found (step 812) with the process terminating thereafter. With reference again to step 810, if resource management tool 420 determines that one or more discrepancies have been found between the local scan and the remote scan, then resource management tool 420 documents and logs the discrepancies (step 814). For example, if suspicious network discrepancies between the local scan list and the remote scan list are found, they will be logged.

In this example, suspicious network discrepancies may include a use of one or more ports by a group of tasks that is in the remote scan list, but which is not in the local scan list. In this example, the absence of the use in the local scan list indicates that the use identified in the remote scan list is associated with a malicious group of tasks running on host computer system 200.

Next, resource management tool 420 flags or identifies the "suspicious" host computer system as possibly infected (step 816). Further tests are run on the flagged host computer system 200 and the flagged host computer system 200 is monitored to evaluate the nature of the discrepancy found and the malicious task currently installed on the host computer system 200 (step 818), ending the process. In an embodiment, host computer system 200 has deployed thereon one or more test programs for testing and/or evaluating any discrepancies found by resource management tool 420. It will be understood by one skilled in the art that the testing and evaluation of host computer system 200 can be manually implemented, as necessary, by an administrator.

Figure 9:
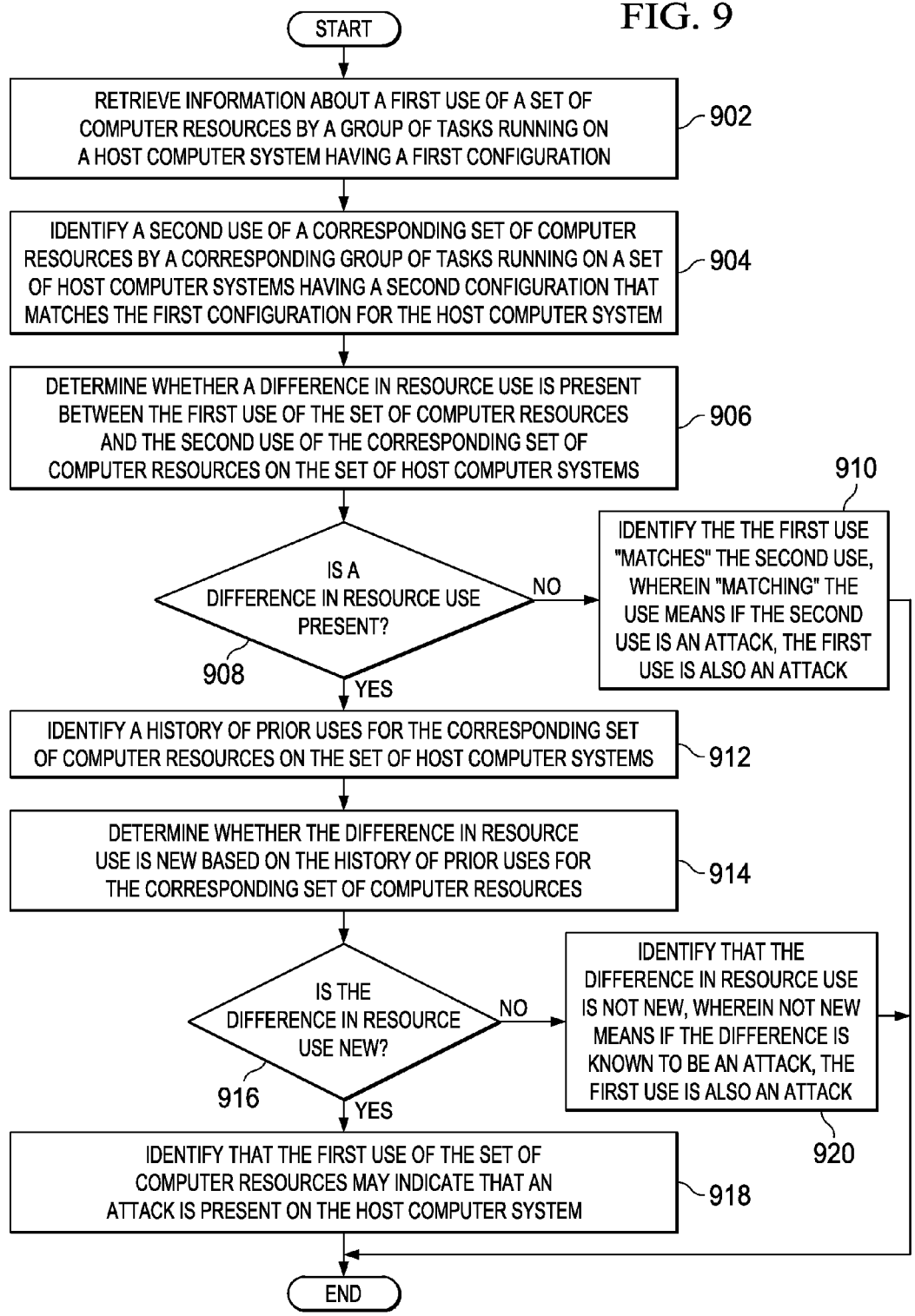
FIG. 9 is a flowchart of a process for identifying malware and in particular for detecting if a use of a set of computer resources by a group of tasks on a host computer system is a new use indicating an attack is present in the host computer system, in accordance with an illustrative embodiment.

With reference now to FIG. 9, a flowchart of a process for identifying malware, and in particular, for detecting if a use of a set of computer resources by a group of tasks on host computer system 200 in FIG. 2 is a new use indicating an attack is present in host computer system 200, is depicted in accordance with an illustrative embodiment. The steps in FIG. 9 may be implemented in computer resource management environment 100 in FIG. 1. In particular, the steps may be implemented in software, hardware, or a combination of the two in resource management computer system 400 in FIG. 4. Still more particularly, the steps may be implemented by resource management tool 420 in resource management computer system 400.

The process begins by retrieving information about a first use of a set of computer resources by a group of tasks running in host computer system 200 having a first configuration (step 902). In these illustrative examples, information about a use of the set of computer resources by a group of tasks running on host computer system 200 may be retrieved from correlation results log 414 in FIG. 4. For example, information about a use of the set of computer resources by a group of tasks running on host computer system 200 retrieved from correlation results log 414 may include a discrepancy found between local scanning results and remote scanning results, as described herein.

The process then identifies a second use of a corresponding set of computer resources by a corresponding group of tasks running on a set of host computer systems having a second configuration that matches the first configuration for host computer system 200 (step 904). In these illustrative examples, a "match" with reference to configurations for host computer systems, means 100% of the configuration of the host computers are the same. In these illustrative examples, match may also mean "close enough", such as 95%, 80% or some other percentage suitable for identifying that two host computer systems are similar host computer systems.

The process then determines whether a difference in resource use is present between the first use of the set of computer resources and the second use of the corresponding set of computer resources in the set of host computer systems (step 906). As depicted (step 908), if the difference in resource use is not present the process identifies that the first use "matches" the second use, wherein "matching" the use means if the second use is an attack, the first use is also an attack (step 910), with the process terminating thereafter.

Otherwise, if the difference in resource use is present, the process identifies a history of prior uses for the corresponding set of computer resources in the set of host computer systems (step 912). For example, the history of prior uses for the corresponding set of computer resources in the set of host computer systems may be retrieved from local storage device 402 in FIG. 4 having stored therein an identification of a group of tasks, an indication of a set of computer resources, an identification of a host computer system, and whether the use is an attack for each use.

The process then determines whether the difference in resource use is new based on the history of prior uses for the corresponding set of computer resources (step 914). Next, a determination is made as to whether the difference in resource use is new (step 916). If the difference in resource use is new, the process identifies that the first use of the set of computer resources may indicate that an attack is present in host computer system 200 (step 918), with the process terminating thereafter. Otherwise, if the difference in resource use is not new, the process identifies that the difference in resource use is not new, wherein not new means if the difference is known to be an attack, the first use is also an attack (step 920), with the process terminating thereafter.

Figure 10:
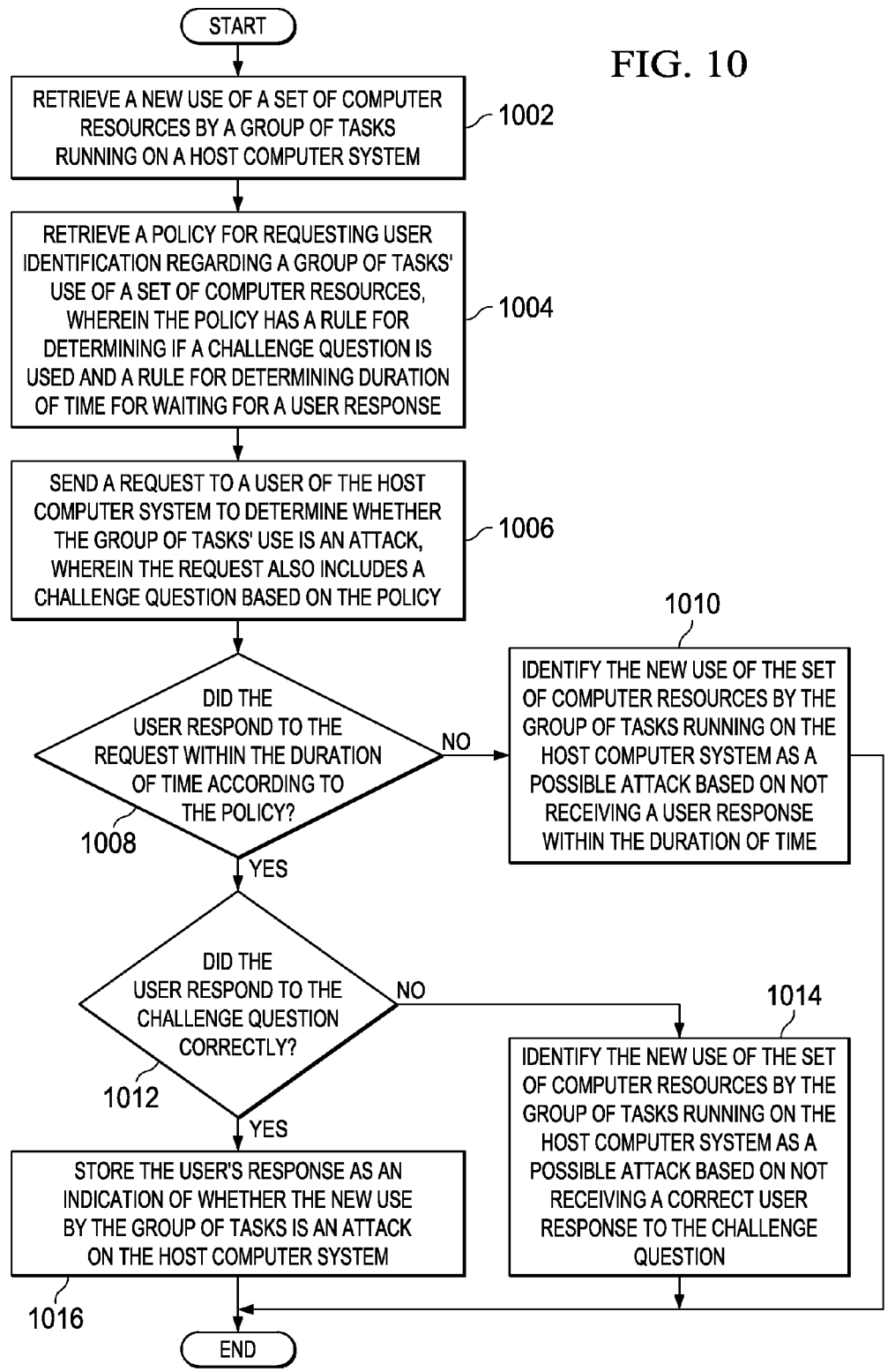
FIG. 10 depicts a flowchart of a process for identifying malware and in particular for requesting a user to determine whether a new use of the set of computer resources by a group of tasks on a host computer system is an attack, in accordance with an illustrative embodiment.

With reference now to FIG. 10, a flowchart of a process for identifying malware, and in particular, for requesting a user to determine whether a new use of a set of computer resources by a group of tasks on host computer system 200 in FIG. 2 is an attack, is depicted in accordance with an illustrative embodiment. The steps in FIG. 10 may be implemented in computer resource management environment 100 in FIG. 1. In particular, the steps may be implemented in software, hardware, or a combination of the two in resource management computer system 400 in FIG. 4. Still more particularly, the steps may be implemented by resource management tool 420 in resource management computer system 400.

The process begins by retrieving a new use of a set of computer resources by a group of tasks running in host computer system 200 (step 1002). The process then retrieves policy 434 in FIG. 4 (step 1004). In this illustrative example, policy 434 is used by the process for requesting user identification regarding a group of tasks' use of a set of computer resources. In this illustrative example, policy 434 has a rule for determining if a challenge question is used and a rule for determining duration of time for waiting for a user response.

The process sends a request to a user of host computer system 200 to determine whether the group of tasks' new use is an attack, wherein the request also includes a challenge question based on the policy (step 1006). In this example, a rule in policy 434 indicates a challenge question must be used when requesting a user to identify if a group of tasks' use is an attack. In other examples, a rule in policy 434 may select a particular type of challenge question to be used. For example, a rule in policy 434 may select a particular type of challenge question for a particular use of computer resources, for a particular group of tasks, for a particular set of computer resources, and for a particular host computer system.

As depicted (step 1008), if the user did not respond to the request within the duration of time according to the policy the process identifies the new use of the set of computer resources by the group of tasks running in host computer system 200 as a possible attack based on not receiving a user response within the duration of time (step 1010), with the process terminating thereafter. Otherwise, if the user did respond to the request within the duration of time according to the policy, the process continues to step 1012.

Next, the process determines whether the user responded to the challenge question correctly (step 1012). If the user responded to the challenge question correctly the process identifies the new use of the set of computer resources by the group of tasks running in host computer system 200 as a possible attack based on not receiving a correct user response to the challenge question (step 1014), with the process terminating thereafter. Otherwise, if the user did respond to the challenge question correctly, the process stores the user's response as an indication of whether the new use by the group of tasks is an attack in host computer system 200 (step 1016), with the process terminating thereafter.

Figure 11:
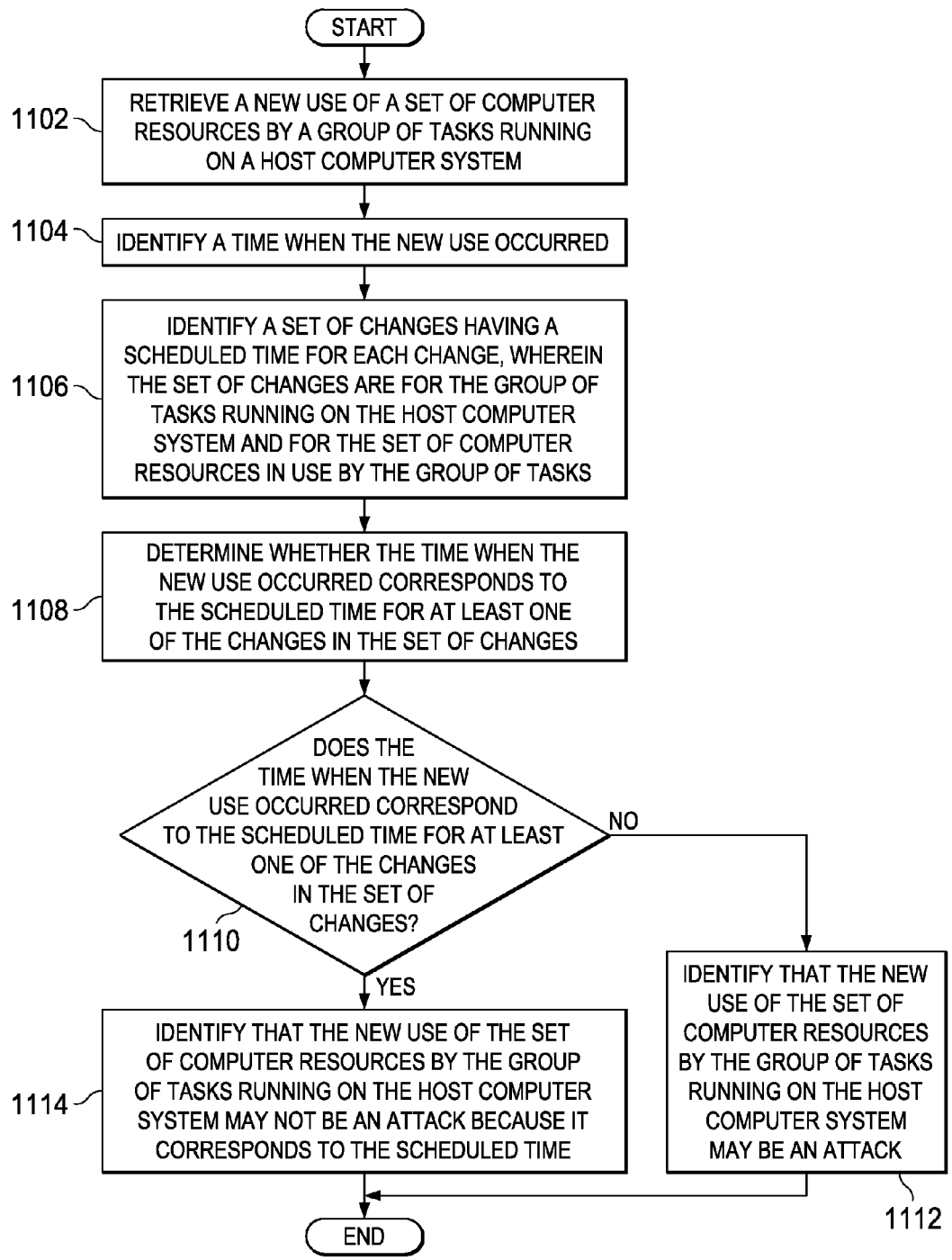
FIG. 11 depicts a flowchart of a process for identifying malware and in particular for detecting if a new use of computer resources by a group of tasks on a host computer system corresponds with a change scheduled to occur at a particular time, in accordance with an illustrative embodiment.

With reference now to FIG. 11, a flowchart of a process for identifying malware, and in particular, for detecting if a new use of a set of computer resources by a group of tasks on host computer system 200 in FIG. 2 corresponds with a change scheduled to occur at a particular time, is depicted in accordance with an illustrative embodiment. The steps in FIG. 11 may be implemented in computer resource management environment 100 in FIG. 1. In particular, the steps may be implemented in software, hardware, or a combination of the two in resource management computer system 400 in FIG. 4. Still more particularly, the steps may be implemented by resource management tool 420 in resource management computer system 400.

The process begins by retrieving a new use of a set of computer resources by a group of tasks running in host computer system 200 (step 1102). The process then identifies a time when the new use occurred (step 1104). In these illustrative examples, a new use of a set of computer resources by a group of tasks running on host computer 200 and a time for the new use may be retrieved from correlation results log 414 in FIG. 4. For example, information about a new use of the set of computer resources by a group of tasks running on host computer 200 retrieved from correlation results log 414 may include a discrepancy found between local scanning results and remote scanning results, as described herein.

The process identifies a set of changes having a scheduled time for each change, wherein the set of changes are for the group of tasks running on host computer system 200 and for the set of computer resources in use by the group of tasks running on host computer system 200 (step 1106). A "set" as used herein with reference to changes, means one or more changes. For example, "set of changes" is one or more changes. Set of changes can be changes to software, hardware, or a combination of the two. In these illustrative examples, set of changes may be updates to programs on host computer system 200 or on another computer system in network 120 in FIG. 1.

The process then determines whether the time when the new use occurred corresponds to the scheduled time for at least one of the changes in the set of changes (step 1108). A determination is made as to whether the time when the new use occurred correspond to the scheduled time for at least one of the changes in the set of changes (step 1110). If the time when the new use occurred does not correspond to a scheduled time for at least one of the changes in the set of changes the process identifies the new use of the set of computer resources by the group of tasks running in host computer system 200 as a possible attack (step 1112), with the process terminating thereafter. Otherwise, if the time when the use occurred does match the scheduled time for at least one of the changes in the set of changes the process identifies that the new use of the set of computer resources by the group of tasks running in host computer system 200 may not be an attack because it corresponds to the scheduled time (step 1114), with the process terminating thereafter.

Figure 12:
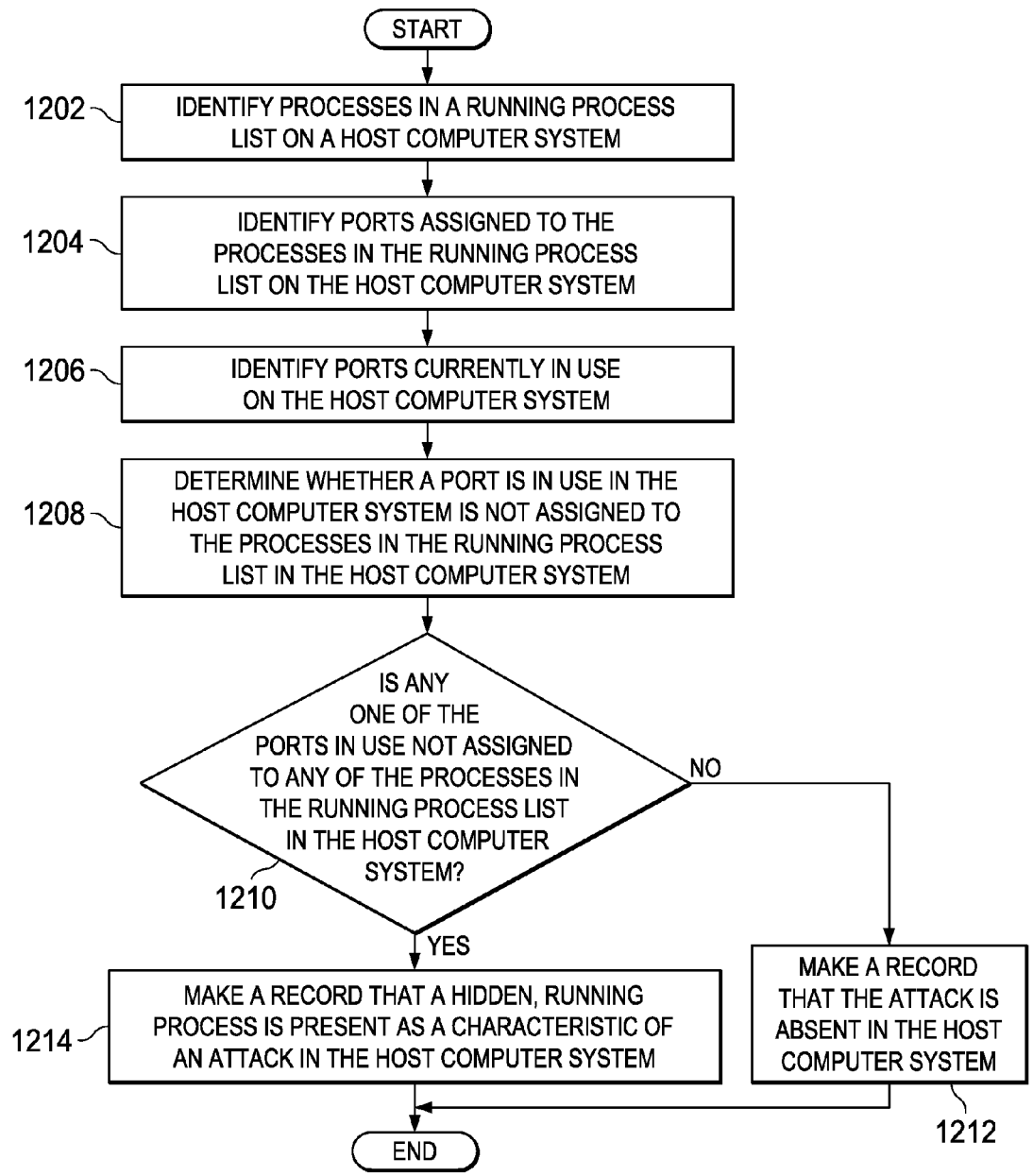
FIG. 12 depicts a flowchart of a process for identifying malware and in particular for detecting if a port currently in use in a host computer system is assigned to a process, in accordance with an illustrative embodiment.

With reference now to FIG. 12, a flowchart of a process for identifying malware and, in particular, for detecting if a port currently in use in host computer system 200 is assigned to a process in host computer system 200 in FIG. 2, in accordance with an illustrative embodiment. The steps in FIG. 12 may be implemented in computer resource management environment 100 in FIG. 1. In particular, the steps may be implemented in software, hardware, or a combination of the two in resource management computer system 400 in FIG. 4. Still more particularly, the steps may be implemented by resource management tool 420 in resource management computer system 400.

The process begins by identifying processes in a running process list on host computer system 200 (step 1202). In these illustrative examples, a running process list may be running task list 213 in FIG. 2. The process identifies ports assigned to the processes in the running process list on host computer system 200 (step 1204). The process then identifies ports in use in host computer system 200 (step 1206). In these illustrative examples, information about a use of the ports by processes running on host computer system 200 may be retrieved from correlation results log 414 in FIG. 4. For example, information about a use of ports by processes running on host computer system 200 retrieved from correlation results log 414 may include a discrepancy found between local scanning results and remote scanning results, as described herein.

The process determines whether a port is in use in host computer system 200 that is unassigned to the processes in the running process list in host computer system 200 (step 1208). A determination is made as to whether any one of the ports that is currently in use in the host computer system is not assigned to any of the processes in the running process list in host computer system 200 (step 1210). If each of the ports that is currently in use is assigned to any of the processes in the running process list in host computer system 200, the process makes a record that the attack is absent in host computer system 200 (step 1212), with the process terminating thereafter. Otherwise, if one of the ports is currently in use but not assigned to any of the processes in the running process list in host computer system 200, the process makes a record that a hidden, running process is present as a characteristic of an attack in host computer system 200 (step 1214), with the process terminating thereafter. In step 1214, additional investigation may be made to determine whether a false positive has occurred in identifying an attack as being present. The additional investigation may be made using steps such as those illustrated in FIGS. 9-11.

Accordingly, the one or more illustrative embodiments provide a system, method and a program product for detecting the presence of malicious tasks running on a computer system or host computer system, in accordance with an embodiment of the invention. The illustrative embodiments may interrogate the host computer system both locally and remotely. Local interrogation could be conducted through a locally installed agent (user or administrator-level access), or through standard network service interrogation techniques that typically require administrative-level access. Remote service interrogation of the host computer system can be conducted with standard port scanning and vulnerability scanning technologies. The device labeled "suspicious host" may or may not originally be "suspicious" and the interrogation of the host may be a routine/scheduled event for preemptive detection of malicious tasks and unwanted tasks installed on host computer systems. Local host enumeration of network services could be achieved through the use of default operating system query tools, or custom tools. The remote scanning tool may use standard remote port scanning techniques to identify open ports and enumerate the tasks behind them. The resource management tool could be a stand-alone device, part of a resource management toolset, or part of an additional software suite whose purpose is to act upon any discrepancies identified between "local scanning results" and "remote scanning results."

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for identifying malware, the method comprising the steps of:
identifying, by one or more processors, processes in a running process list on a first computer system;
identifying, by one or more processors, ports assigned to the processes in the running process list on the first computer system;
identifying, by one or more processors, ports currently in use in the first computer system;
determining, by one or more processors, a first use of a first port of the ports currently in use in the first computer system but not assigned to any of the processes in the running process list in the first computer system; and
determining, by one or more processors, whether a second computer system is using a second port on the second computer system in a non-malicious manner, wherein the second port on the second computer system maps to the first port on the first computer system, and
if determined that the second computer system is using the second port on the second computer system in the non-malicious manner, determining, by one or more processors, that the first port is not being used in an attack, and
if determined that the second computer system is not using the second port on the second computer system in the non-malicious manner, determining, by one or more processors, that a hidden, running process is present as a characteristic of an attack.

2. The method of claim 1, wherein the first computer system is remote from each of one or more processors which perform the identifying and determining steps, and further comprising:
responsive to a determination that none of the ports is currently in use and unassigned to any of the processes in the running process list in the first computer system, one or more processors making a record that there is no hidden process attack in the first computer system.

3. The method of claim 1, wherein the step of identifying, by one or more processors, ports currently in use in the first computer system comprises:
identifying, by one or more processors, a group of open ports on the first computer system, wherein the group of open ports includes the ports assigned to the processes in the running process list and the ports currently in use but not assigned to any of the processes in the running process list in the first computer system.

4. The method of claim 3, wherein the first use of the first port of the ports currently in use but not assigned to any of the processes in the running process list in the first computer system is by a group of tasks running in the first computer system, and wherein the step of determining, by one or more processors, whether the second computer system is using the second port on the second computer system in the non-malicious manner is further responsive to a determination that a difference in port use is not new comprising:
retrieving, by one or more processors, a first configuration for the first computer system;
identifying, by one or more processors, a second use of a corresponding port by a corresponding group of tasks running on a set of computer systems having a second configuration that matches the first configuration for the first computer system, wherein the corresponding port maps to the first port and the corresponding group of tasks running on the set of computer systems correspond to the group of tasks running in the first computer system;
determining, by one or more processors, whether the difference in port use is present between the first use of the first port and the second use of the corresponding port in the set of computer systems; and
responsive to a determination that the difference in port use is present, determining, by one or more processors, whether the difference in port use by the group of tasks in the first computer system is new based on a history of prior uses for the corresponding port in the set of computer systems.

5. The method of claim 4, wherein the step of determining, by one or more processors, whether the second computer system is using the second port on the second computer system in the non-malicious manner is further responsive to a determination that a time when the first use occurred corresponds to a scheduled time for a change comprising:
responsive to the determination that the difference in port use is new, identifying, by one or more processors, the time when the first use occurred and a set of changes having a scheduled time for each change, wherein the set of changes are for the group of tasks and for a set of networking resources for the first port; and
determining, by one or more processors, whether the time when the first use occurred corresponds to the scheduled time for at least one of the changes in the set of changes.

6. The method of claim 4, further comprising:
responsive to the determination that the difference in port use is new, sending, by one or more processors, a request to a user of the first computer system to indicate whether the difference in port use is the attack.

7. The method of claim 6, wherein the request to the user of the first computer system to indicate whether the difference in port use is the attack includes an additional random question, wherein an incorrect answer to the additional random question indicates that the difference in port use is the attack.

8. The method of claim 1, wherein the step of determining, by one or more processors, that the hidden, running process is present as the characteristic of the attack is further responsive to an identification, by one or more processors, of one or more differences present between performance information generated by a first monitoring program and a second monitoring program comprising:
retrieving, by one or more processors, performance information about the first use of the first port by a group of tasks running in the first computer system by the first monitoring program, wherein the first monitoring program is configured to monitor port use by the group of tasks running in the first computer system;
retrieving, by one or more processors, performance information generated by the second monitoring program in a remote computer system, wherein the second monitoring program is configured to monitor the first use of the first port by the group of tasks running in the first computer system; and comparing, by one or more processors, the performance information generated by the first monitoring program to the performance information generated by the second monitoring program to identify the one or more differences between the performance information generated by the first monitoring program and the second monitoring program.

9. A computer system for identifying malware, the computer system comprising:

one or more processors, one or more computer-readable tangible storage devices, one or more computer-readable memories, and program instructions stored on at least one the computer-readable tangible storage devices for execution by at least one of the one or more processors via at least one of the computer-readable memories, the program instructions comprising:

first program instructions to identify processes in a running process list on a first computer;

second program instructions to identify ports assigned to the processes in the running process list on the first computer;

third program instructions to identify ports currently in use in the first computer;

fourth program instructions to determine a first use of a first port of the ports currently in use in the first computer but not assigned to any of the processes in the running process list in the first computer; and fifth program instructions to determine whether a second computer is using a second port on the second computer in a non-malicious manner, wherein the second port on the second computer maps to the first port on the first computer, and if determined that the second computer system is using the second port on the second computer system in the non-malicious manner, determine that the first port is not being used in an attack, and if determined that the second computer system is not using the second port on the second computer system in the non-malicious manner, determine that a hidden, running process is present as a characteristic of the attack.

10. The computer system of claim 9, wherein the first computer is remote from the computer system, and further comprising:

sixth program instructions, stored on at least one of the one or more storage devices for execution by at least one of the one or more processors via at least one of the one or more memories, to make a record that there is no hidden process attack in the first computer, responsive to a determination that none of the ports are currently in use unassigned to any of the processes in the running process list in the first computer.

11. The computer system of claim 9, wherein the third program instructions to identify ports currently in use in the first computer comprise program instructions to identify a group of open ports on the first computer, wherein the group of open ports includes the ports assigned to the processes in the running process list and the ports currently in use but not assigned to any of the processes in the running process list in the first computer.

12. The computer system of claim 11, wherein the first use of the first port of the ports currently in use but not assigned to any of the processes in the running process list in the first computer is by a group of tasks running in the first computer, and wherein the fifth program instructions to determine whether the second computer is using the second port on the second computer in the non-malicious manner is further responsive to a determination that a difference in port use is not new by sixth program instructions, stored on at least one of the one or more storage devices for execution by at least one of the one or more processors via at least one of the one or more memories, the sixth program instructions comprising:

program instructions to retrieve a first configuration for the first computer;

program instructions to identify a second use of a corresponding port by a corresponding group of tasks running on a set of computers having a second configuration that matches the first configuration for the first computer, wherein the corresponding port maps to the first port and the corresponding group of tasks running on the set of computers correspond to the group of tasks running in the first computer;

program instructions to determine whether the difference in port use is present between the first use of the first port and the second use of the corresponding port in the set of computers; and program instructions to determine whether the difference in port use by the group of tasks in the first computer is new based on a history of prior uses for the corresponding port in the set of computers, responsive to a determination that the difference in port use is present.

13. The computer system of claim 12, wherein the fifth program instructions to determine whether the second computer is using the second port on the second computer in the non-malicious manner is further responsive to a determination that a time when the first use occurred corresponds to a scheduled time for a change by seventh program instructions, stored on at least one of the one or more storage devices for execution by at least one of the one or more processors via at least one of the one or more memories, the seventh program instructions comprising:

program instructions to identify the time when the first use occurred and a set of changes having a scheduled time for each change, wherein the set of changes are for the group of tasks and for a set of networking resources for the first port, responsive to the determination that the difference in port use is new; and program instructions to determine whether the time when the first use occurred corresponds to the scheduled time for at least one of the changes in the set of changes.

14. The computer system of claim 12, further comprising:

seventh program instructions, stored on at least one of the one or more storage devices for execution by at least one of the one or more processors via at least one of the one or more memories, to send a request to a user of the first computer to indicate whether the difference in port use is the attack, responsive to the determination that a difference in port use is new, the request to the user of the first computer to indicate whether the difference in port use is the attack includes an additional random question, wherein an incorrect answer to the additional random question indicates the difference in port use is the attack.

15. A computer program product for identifying malware, the computer program product comprising:

one or more computer-readable tangible storage devices, one or more processors, and program instructions stored on at least one of the computer-readable tangible storage devices for execution by at least one of the one or more processors, the program instructions comprising:

program instructions to identify processes in a running process list on a first computer system;

program instructions to identify ports assigned to the processes in the running process list on the first computer system;

program instructions to identify ports currently in use in the first computer system;

program instructions to determine a first use of a first port of the ports currently in use in the first computer system but not assigned to any of the processes in the running process list in the first computer system; and program instructions to determine whether a second computer system is using a second port on the second computer system in a non-malicious manner, wherein the second port on the second computer system maps to the first port on the first computer system, and if determined that the second computer system is using the second port on the second computer system in the non-malicious manner, determine that the first port is not being used in an attack, and if determined that the second computer system is not using the second port on the second computer system in the non-malicious manner, determine that a hidden, running process is present as a characteristic of the attack.

16. The computer program product of claim 15, wherein the first computer system is remote from the one or more processors, and further comprising:

program instructions, stored on at least one of the one or more computer-readable tangible storage devices, to make a record that there is no hidden process attack in the first computer system, responsive to a determination that none of the ports are currently in use unassigned to any of the processes in the running process list in the first computer system.

17. The computer program product of claim 15, wherein the program instructions to identify ports currently in use in the first computer system comprises program instructions to identify a group of open ports on the first computer system, wherein the group of open ports includes the ports assigned to the processes in the running process list and the ports currently in use but not assigned to any of the processes in the running process list in the first computer system.

18. The computer program product of claim 17, wherein the first use of the first port of the ports currently in use but not assigned to any of the processes in the running process list in the first computer system is by a group of tasks running in the first computer system, and wherein the program instructions to determine whether the second computer is using the second port on the second computer in the non-malicious manner is further responsive to a determination that a difference in port use is not new by program instructions, stored on at least one of the one or more computer-readable tangible storage devices, comprising:

program instructions to retrieve a first configuration for the first computer system;

program instructions to identify a second use of a corresponding port by a corresponding group of tasks running on a set of computer systems having a second configuration that matches the first configuration for the first computer system, wherein the corresponding port maps to the first port and the corresponding group of tasks running on the set of computer systems correspond to the group of tasks running in the first computer system;

program instructions to determine whether the difference in port use is present between the first use of the first port and the second use of the corresponding port in the set of computer systems; and program instructions to determine whether the difference in port use by the group of tasks in the first computer system is new based on a history of prior uses for the corresponding port in the set of computer systems, responsive to a determination that the difference in port use is present.

19. The computer program product of claim 18, wherein the program instructions to determine whether the second computer is using the second port on the second computer in the non-malicious manner is further responsive to a determination that a time when the first use occurred corresponds to a scheduled time for a change by program instructions, stored on at least one of the one or more computer-readable tangible storage devices, comprising:

program instructions to identify the time when the first use occurred and a set of changes having a scheduled time for each change, wherein the set of changes are for the group of tasks and for a set of networking resources for the first port, responsive to the determination that the difference in port use is new; and program instructions to determine whether the time when the first use occurred corresponds to the scheduled time for at least one of the changes in the set of changes.

20. The computer program product of claim 18, further comprising:

program instructions, stored on at least one of the one or more computer-readable tangible storage devices, to send a request to a user of the first computer system to indicate whether the difference in port use is the attack, responsive to the determination that the difference in port use is new, wherein the request to the user of the first computer system to indicate whether the difference in port use is the attack includes an additional random question, and wherein an incorrect answer to the additional random question indicates the difference in port use is the attack.

* * * * *